(12) United States Patent
Johnson et al.

(10) Patent No.: US 8,845,323 B2
(45) Date of Patent: Sep. 30, 2014

(54) METHOD AND APPARATUS FOR OXY-FUEL COMBUSTION

(75) Inventors: Leighta M. Johnson, Allentown, PA (US); Matthew J. Watson, Bethlehem, PA (US); Aleksandar G. Slavejkov, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 696 days.

(21) Appl. No.: 12/529,401

(22) PCT Filed: Mar. 2, 2008

(86) PCT No.: PCT/US2008/055589
§ 371 (c)(1),
(2), (4) Date: Sep. 1, 2009

(87) PCT Pub. No.: WO2008/109482
PCT Pub. Date: Sep. 12, 2008

(65) Prior Publication Data
US 2010/0086886 A1    Apr. 8, 2010

Related U.S. Application Data

(60) Provisional application No. 60/904,482, filed on Mar. 2, 2007.

(51) Int. Cl.
| | |
|---|---|
| *F23N 5/00* | (2006.01) |
| *F23D 11/10* | (2006.01) |
| *F23N 1/02* | (2006.01) |
| *F23N 5/24* | (2006.01) |
| *F23N 5/10* | (2006.01) |
| *F23G 7/05* | (2006.01) |

(52) U.S. Cl.
CPC    *F23G 7/05* (2013.01); *F23D 11/10* (2013.01); *F23N 1/022* (2013.01); *F23N 5/242* (2013.01); *F23N 5/102* (2013.01); *F23N 2027/24* (2013.01)
USPC ........ 431/72; 431/4; 431/6; 431/11; 431/207; 110/238; 588/320

(58) Field of Classification Search
USPC ............. 431/4, 6, 8, 11, 207, 208, 10, 9, 159, 431/181, 187; 110/238; 588/320, 900, 328
See application file for complete search history.

(56) References Cited

U.S. PATENT DOCUMENTS 2,709,646 A * 5/1955 Haug ............................... 48/211
2,808,011 A * 10/1957 Miller et al. ................... 110/238

(Continued)

FOREIGN PATENT DOCUMENTS

WO    WO 2005/052451    6/2005

OTHER PUBLICATIONS

International Search Report and Written Opinion of the International Searching Authority for International Application No. PCT/US2008/055589, dated Sep. 29, 2008.

*Primary Examiner* — Avinash Savani
(74) *Attorney, Agent, or Firm* — Larry S. Zelson (57) ABSTRACT

The invention comprises a method and apparatus for burning combustible fluids, such as biofuel byproducts and feedstocks, which are difficult to burn in a stable and clean manner. The method includes preheating the combustion zone prior to initiating flow of the combustible fluid and maintaining a minimum oxygen concentration in the oxidant gas.

18 Claims, 4 Drawing Sheets

(56) References Cited

U.S. PATENT DOCUMENTS

| | | | | |
|---|---|---|---|---|
| 3,237,677 A | * | 3/1966 | Buchholz et al. | 122/236 |
| 3,357,375 A | * | 12/1967 | Brophy | 588/320 |
| 3,583,339 A | * | 6/1971 | Kube | 110/346 |
| 3,659,786 A | * | 5/1972 | Vier et al. | 239/5 |
| 3,682,114 A | * | 8/1972 | Scheubel | 110/263 |
| 3,718,102 A | * | 2/1973 | Hemsath et al. | 110/238 |
| 3,734,035 A | * | 5/1973 | Whitfield | 588/320 |
| 3,748,081 A | * | 7/1973 | Hummell | 431/7 |
| 3,756,170 A | * | 9/1973 | Lang | 110/238 |
| 3,779,691 A | * | 12/1973 | Sakata et al. | 431/190 |
| 3,828,700 A | * | 8/1974 | Ragot | 110/238 |
| 3,858,532 A | * | 1/1975 | Jorgensen | 110/238 |
| 3,951,581 A | * | 4/1976 | Nakayama et al. | 588/320 |
| 4,004,875 A | * | 1/1977 | Zink et al. | 431/9 |
| 4,060,371 A | * | 11/1977 | Gentry et al. | 431/75 |
| 4,073,871 A | * | 2/1978 | Opitz et al. | 588/320 |
| 4,094,625 A | * | 6/1978 | Wang et al. | 431/9 |
| 4,195,779 A | | 4/1980 | Auclair et al. | |
| 4,206,711 A | * | 6/1980 | Konrad | 110/238 |
| 4,249,885 A | * | 2/1981 | Reich | 431/38 |
| 4,278,494 A | * | 7/1981 | Lilja et al. | 159/16.2 |
| 4,375,950 A | * | 3/1983 | Durley, III | 431/12 |
| 4,462,318 A | * | 7/1984 | Carbeau et al. | 110/238 |
| 4,475,466 A | * | 10/1984 | Gravely | 588/321 |
| 4,519,769 A | * | 5/1985 | Tanaka | 431/4 |
| 4,728,282 A | * | 3/1988 | May | 431/9 |
| 5,129,335 A | | 7/1992 | Lauwers | |
| 5,154,599 A | * | 10/1992 | Wunning | 431/215 |
| 5,156,098 A | * | 10/1992 | Camp | 110/238 |
| 5,170,727 A | * | 12/1992 | Nielsen | 110/346 |
| 5,968,378 A | * | 10/1999 | Jensen | 219/121.43 |
| 6,132,203 A | * | 10/2000 | Masin | 431/121 |
| 6,234,092 B1 | | 5/2001 | Domschke et al. | |
| 6,450,108 B2 | * | 9/2002 | Bool et al. | 110/348 |
| 6,540,504 B2 | * | 4/2003 | Kobayashi et al. | 431/77 |
| 6,546,883 B1 | * | 4/2003 | Fink et al. | 110/238 |
| 6,652,265 B2 | * | 11/2003 | Cain | 431/6 |
| 6,694,928 B2 | * | 2/2004 | McNeil | 123/1 A |
| 6,796,789 B1 | * | 9/2004 | Gibson et al. | 431/2 |
| 6,824,383 B2 | * | 11/2004 | Cain | 431/12 |
| 6,843,648 B2 | * | 1/2005 | Flament et al. | 431/9 |
| 7,062,917 B2 | * | 6/2006 | Wunning et al. | 60/750 |
| 7,163,392 B2 | * | 1/2007 | Feese et al. | 431/10 |
| 7,168,949 B2 | * | 1/2007 | Zinn et al. | 431/350 |
| 2002/0192608 A1 | | 12/2002 | Flament et al. | |
| 2003/0029814 A1 | * | 2/2003 | Begell et al. | 210/769 |
| 2004/0255873 A1 | * | 12/2004 | Cueman et al. | 123/1 A |
| 2005/0244764 A1 | * | 11/2005 | Haase | 431/4 |
| 2006/0063118 A1 | | 3/2006 | Oga et al. | |
| 2006/0070912 A1 | * | 4/2006 | Khan | 208/13 |
| 2006/0165898 A1 | * | 7/2006 | Kodas et al. | 427/258 |
| 2006/0172238 A1 | | 8/2006 | Cook | |

* cited by examiner

|  | Glycerol | Pyrolysis Liquid* | Soybean Oil | Tallow |
|---|---|---|---|---|
| Viscosity (cP) | 1420 (20°C) | 83-167 (20 °C) | 69 (20°C) | 58 (40°C) |
| Heating Value (Btu/gal) 60°F | 80,000 | 56,998 – 78,897 | 135,360 | 126,549 |
| Flash Point (°F) | 320-380 | 104-230 | 316-329 | 394 |
| Heat of Vaporization (Btu/gal) | 4363 | N/A | N/A | N/A |

Fig. 7

* Pyrolysis products of Forest Residue containing 40% degraded Lignin, 20% sugar, 20% water

|  | #2 Fuel Oil | #6 Fuel Oil | Biodiesel | Ethanol |
|---|---|---|---|---|
| Viscosity (cP) | 2.6 (20°C) | 6-55 (100°C) | 4.2-5.2 (40°C) | 1.9 (20°C) |
| Heating Value (Btu/gal) 60°F | 129,050 -137,000 | 151,300- 155,900 | 118,170- 128,000 | 76,330 |
| Flash Point (°F) | 140-158 | 150 | 300-338 | 55-62 |

Fig. 8

METHOD AND APPARATUS FOR OXY-FUEL COMBUSTION

CROSS REFERENCE TO RELATED APPLICATION(S)

This application claims the benefit of U.S. Provisional Patent Application No. 60/904,482, filed Mar. 2, 2007, which is incorporated by reference as if fully set forth.

FIELD OF INVENTION

The invention comprises a method and apparatus for combusting fluids which are combustible but are difficult to efficiently and cleanly burn using conventional methods.

BACKGROUND

The United States currently imports six million barrels of oil per day to supply 67% its transportation fuel requirements. US energy policy provides incentives to switch from fossil fuels to renewable energy sources. Expanding the use of renewable energy sources enhances energy security while supplying income to farmers and land owners and improving air quality. Renewable energy sources derived from plant material (biomass) are expected to be a significant component of this new renewable energy mix because of the large scale and high productivity of agriculture in the US (with annual yields of 672 million pounds of corn and 120 million dry tons of agricultural residue).

Existing technologies for converting biomass to transportation fuels such as ethanol and biodiesel produce significant quantities of non-fuel byproducts. Most current technologies can only convert about 60% of the available biomass carbon to fuel. The remaining biomass carbon is retained in byproducts, such as corn distillers dried grains with solubles (DDGS), corn gluten feed from ethanol production, and glycerol from biodiesel production. Bio oils or pyrolysis liquids are produced from biomass gasification Many of these byproducts require further refinement and/or processing (requiring additional energy and capital expenditures) in order to have any significant market value.

Efforts have been made to extract energy from such byproducts by using them as fuels for melting, heating, or power generation applications. Unfortunately, many low-value byproducts of ethanol, biodiesel and syngas production are very difficult to burn. Many are low-Btu fuels in liquid or solid form, which are more difficult to ignite and/or to burn with a stable flame than traditional fossil fuels. In addition, many bio-fuel byproducts produce toxic compounds and/or environmental contaminants when burned improperly. Feedstocks for biofuel production, such as soybean oil, corn oil and other vegetable oils, for example, are also a potential source of energy but are also difficult to burn in a stable and clean manner.

For example, glycerol (a byproduct of biodiesel production) is difficult to burn because it has a high viscosity (1500 cp compared with 84 cp for olive oil), as well as high flash point (320-380 degrees F.) and auto ignition temperatures (710-833 degrees F.). The viscosity of the crude glycerol byproduct, a liquid separated from the biodiesel fuel produced from the transesterification of plant oil, is lower than the viscosity of pure glycerol because it contains residual water and impurities from the biodiesel reaction. Unfortunately, the additional water and impurities further inhibit the combustion process. In addition, glycerol produces a toxic gas, known as acrolein, if it is burned at temperatures below 1,000 degrees F. and often produces other undesirable products of combustion (e.g., carbon monoxide and, particulate matter) when burned at temperatures below 1500 degrees F.

Related art includes U.S. Pat. Nos. 6,968,791 and 6,910,432.

SUMMARY

In one respect, the invention comprises a burner having a discharge end, at least one atomizing nozzle located at the discharge end and at least one oxidant gas port located at the discharge end. The burner is preferably adapted to be installed with discharge end being exposed to a combustion zone. A control unit is also provided to control operation of the burner. The control unit preferably includes a temperature sensor that is adapted to measure temperature inside the combustion zone, a combustible fluid valve that is adapted to regulate flow of a combustible fluid to the atomizing nozzle and an oxidant gas valve that is adapted to regulate flow of an oxidant gas to the at least one oxidant gas nozzle. The control unit is also preferably operationally configured to (1) prevent the flow of combustible fluid to the atomizing nozzle unless the temperature sensor indicates a temperature in the combustion zone that is no less than a preset minimum temperature and (2) supply the oxidant gas to the at least one oxidant gas nozzle so that the overall oxygen concentration of the oxidant gas is at least 29%.

In another respect, the invention comprises preheating a combustion zone to a temperature of at least 1500 degrees F., then atomizing a combustible fluid, having a flash point of no less than 250 degrees F., into a combustion zone. An oxidant gas, having an oxygen concentration of no less than 29% on a volume basis, is introduced into the combustion zone either immediately prior to or concurrently with the introduction of the combustible fluid. The flow rate of the oxidant gas is preferably sufficient to supply at least 90% of a stoichiometric amount of oxygen necessary for complete combustion of the combustible fluid.

In yet another respect, the invention comprises preheating a combustion zone to a temperature of at least 1500 degrees F., then atomizing a combustible fluid, having a heating value of no more than 100,000 BTU/gal, into the combustion zone. Preferably the viscosity of the combustible fluid is reduced from an initial viscosity of greater than 40 cP to a reduced viscosity of no more than 40 cP prior to being atomized. An oxidant gas having an oxygen concentration of no less than 29% on a volume basis is preferably introduced into the combustion zone either immediately prior to or concurrently with the introduction of the combustible fluid. The flow rate of the oxidant gas is preferably sufficient to supply at least 90% of a stoichiometric amount of oxygen necessary for complete combustion of the combustible fluid.

DETAILED DESCRIPTION OF THE PREFERRED EMBODIMENT(S)

The present invention comprises a method and system for burning low-value bio-fuel byproducts and feedstocks as fuel using a combustion device, such as an oxy-fuel burner. Many such byproducts and feedstocks are combustible but, as note above, most cannot support a stable flame and/or may produce toxic compounds and/or environmental contaminants when burned in a conventional manner. For the purposes of this application, including the specification and claims, materials that are described as being "combustible" should be understood to mean any material that can be chemically combined with oxygen in an exothermic reaction.

Figure 7:
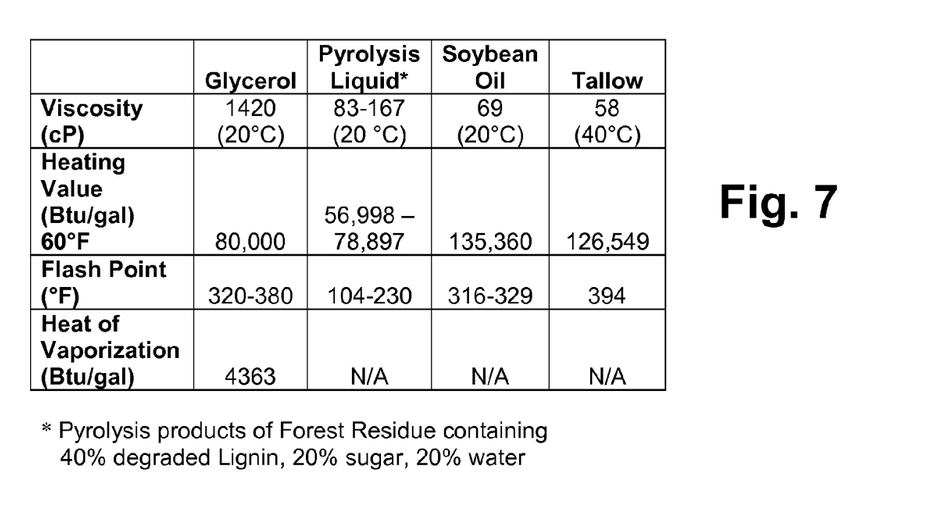
FIG. 7 is a table showing selected physical properties of conventional fuels.
Figure 8:
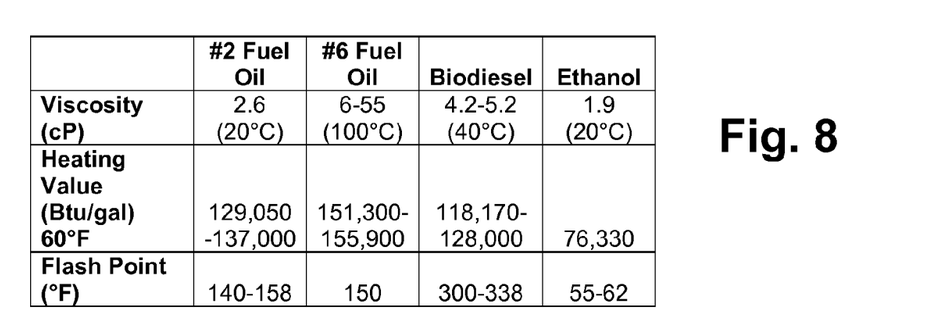
FIG. 8 is a table showing the same physical properties shown in FIG. 7, but for combustible liquids which are not commonly used as fuels.

The potential fuels that are the focus of this invention (hereinafter "combustible fluids") share one or more physical or chemical properties which make clean, sustainable combustion difficult. Examples of such combustible fluids are shown in FIG. 7, along with their respective viscosities, flash points, heating values and heats of vaporization. For comparison, examples of liquids which are commonly used as fuels (and the same physical property information as show in FIG. 7) are provided in FIG. 8. When compared with more traditional fuels, nearly all of the combustible fluids shown in FIG. 7 have a relatively high initial viscosity (i.e., the viscosity of the fluid at ambient temperature without being subjected to any further processing after completion of the bio-fuel process), which makes atomization more difficult. In addition, they have very high flash points (e.g., above 250 degrees F.) and/or the combination of a relatively low heating value (e.g., no more than 100,000 BTU/gal) and a relatively high heat of vaporization (e.g., no less than 2500 BTU/gal).

Figure 1:
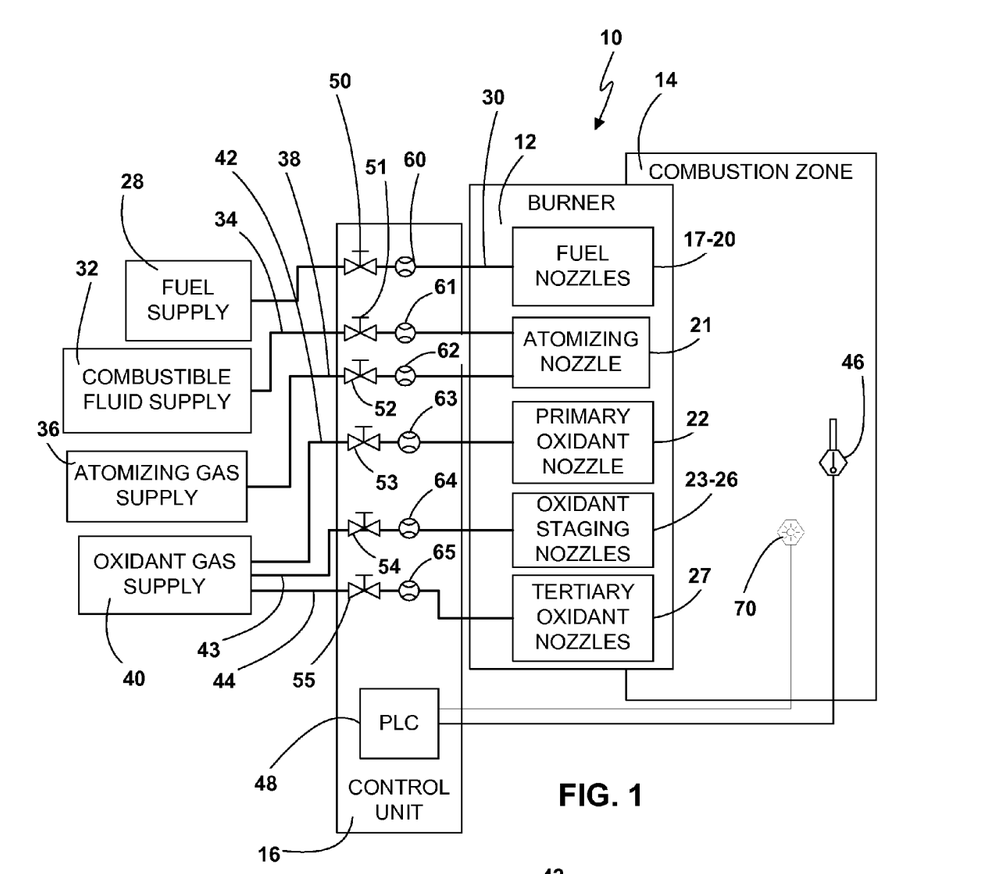
FIG. 1 is a block diagram showing an exemplary burner system.

FIG. 1 shows a block diagram of a burner system 10 which would be suitable for implementing the present invention. The burner system 10 includes a burner 12 and a control unit 16, which controls operation of the burner 12.

Figure 3:
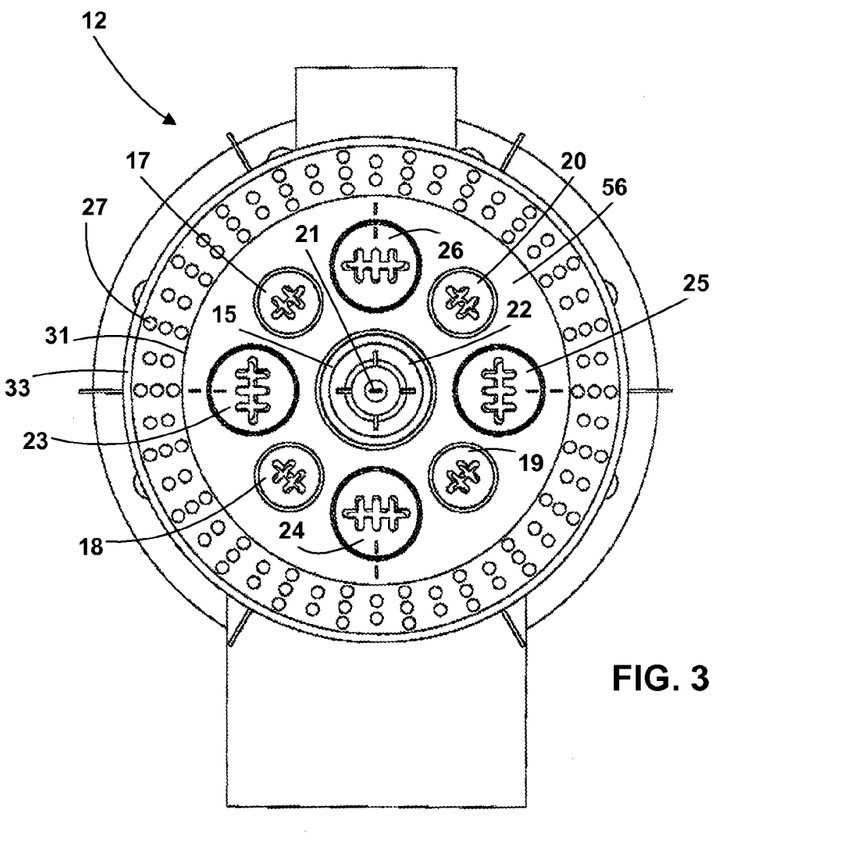
FIG. 3 is a front view of a burner.

Referring to FIGS. 1 and 3, the burner 12 includes fuel nozzles 17-20, an atomizing nozzle 21, a primary oxidant nozzle 22, oxidant staging nozzles 23-26 and tertiary oxidant nozzles 27. The atomizing nozzle 21 is located in the center of the discharge end 56 of the burner 12. In this embodiment, the atomizing nozzle 21 is a gas-assisted atomizing (pneumatic) nozzle. Other types of atomizers could, of course, be used, e.g., a pressure atomizing (hydraulic) nozzle or a carrier-gas injection nozzle, provided that the atomizer is suited to atomize the combustible fluid being used.

Preferably, the burner 12 is capable of delivering oxidizing gas to the atomized combustible fluid from all three oxidant nozzle sets. The primary oxidant nozzle 22 is defined by the annular space between the outer surface of the atomizing nozzle 21 and the inner surface of a concentric pipe 15 into which the atomizing nozzle 21 is inserted. In this embodiment the oxidant staging nozzles 23-26 are positioned radially and equidistant from the combustible fluid nozzle and at 90 degree angles from one another to deliver a secondary flow of oxidizing gas. In addition, the oxidant staging nozzles 23-26 are preferably angled inwardly, to direct the oxidizing gas toward the spray 66. In embodiments where a single staging oxidant nozzle is used, the oxidant nozzle is located at an appropriate distance from the combustible fluid nozzle. The tertiary oxidant nozzles 27 deliver oxidant gas through an annulus defined by the outer surface of a pipe 31, which forms a shell around the oxidant gas supply lines 42-44 and fuel supply line 30, and the inner surface of a larger-diameter pipe 33, which is concentric to pipe 31.

Fuel is supplied to the fuel nozzles 17-20 via a fuel supply line 30 which is connected to a fuel supply 28. A combustible fluid supply line 34 supplies the combustible fluid from a combustible fuel supply 32 to the atomizing nozzle 21. The gas used to atomize the combustible fluid at the atomizing nozzle 21 is provided via a supply line 38, which is connected to an atomizing gas supply 36. Other configurations could be used to supply the pressurized gas needed to atomize the combustible fluid, such as by pumping ambient air. The oxidant gas is supplied to the oxidant nozzles 22-27 via three separate oxidant supply lines 42, 43, 44.

In this embodiment, the fuel supply line 30, combustible fluid supply line 34, atomizing gas supply line 38 and the three oxidant supply lines 42, 43, 44 each include a valve 50-55, respectively, and a flow meter 60-65, respectively, all of which are connected to the a programmable logic controller (PLC) 48. This configuration enables measurement of the flow rate in each supply line as well as independent flow rate control for each supply line, which allows the burner 12 to be used under a wide range of operating conditions, including combustible fluids having a range of combustion properties, as well as a range of oxidant gas compositions.

In commercial applications where less operational flexibility is required, it will be desirable to provide a burner system 10 that is less complex, and therefore, less costly. For example, a burner system could be configured to provide flow monitoring and adjustable flow control only on the combustible fluid supply line 34 and a single valve that feeds all three of the oxidant supply lines 42-44 (the fractional flow rate of each supply line could be fixed). All other supply lines 30 and 45 could be configured to provide constant flow rates, which would allow for the use of on/off valves and the omission of flow meters.

The control unit 16 preferably also includes a temperature sensor 46, which is designed measure the temperature inside the combustion zone 14. As will be described in greater detail herein, monitoring the temperature in the combustion zone 14 is desirable, particularly when the combustible fluid is a bio-fuel production byproduct. The control unit 16 also preferably includes a UV sensor 70, which can allow the control unit 16 to shut off any or all of the valves 50-54 if the UV sensor 70 detects that a flame has gone out or is insufficiently bright.

The control unit 16 may also be programmed to provide a "turn down" mode (having a firing rate that is lower than the normal operational firing rate range for the combustion zone 14) in which a desired target temperature is maintained. As will be discussed in greater detail below, fuel only would be burned (no combustible fluid) in the turn down mode for burner 12.

The fuel could be any conventional burner fuel, such as natural gas, propane or fuel oil. In some embodiments, the fuel could be used to ignite the atomized combustible fluid and/or to heat the combustion zone 14 to a temperature at which the combustible fluid can support a stable flame.

Figure 2:
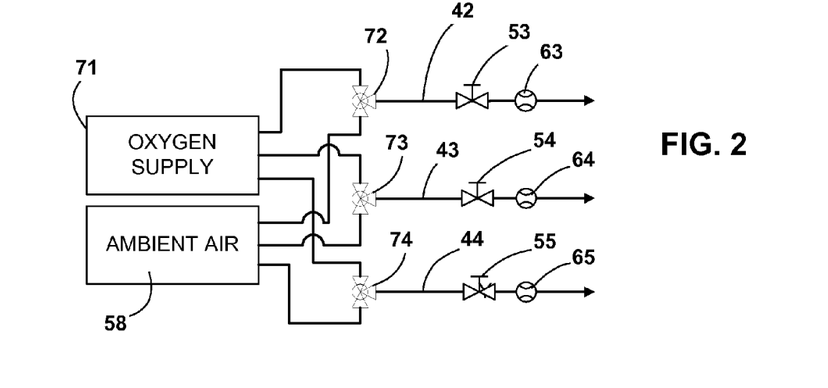
FIG. 2 is a block diagram showing an oxygen supply subsystem.

In this embodiment of the burner 12 is shown using 100% oxygen as the oxidant gas. Alternatively, the oxidant gas could comprise oxygen-enriched air. FIG. 2 shows an alternative oxidant gas supply subsystem in which oxygen from an oxygen supply 72 (typically 100% oxygen) is mixed with ambient air 58 (from a pump or other pressurized source) at mixing valves 72-74, which supply the oxygen-enriched air to the oxidant nozzles (not shown in FIG. 2) through the oxidant supply lines 42-44, respectively. This configuration allows a different oxygen concentrations to be delivered to each of the oxidant supply lines 42-44.

The oxidant gas could optionally be preheated prior to being supplied to the oxidant nozzles 22-27. Preheating the oxidant would assist in maintaining the target furnace temperature, but the cost of the preheat energy will have the undesirable result of reducing the efficiency of the process. Oxidant preheating is only a preferred embodiment if waste process heat or a similarly economical source of energy is readily available. This configuration would enable the oxidant to have an oxygen concentration in the range of 21% (100% flow of ambient air 58) to 100% (100% flow of oxygen 40). As will be explained in greater detail herein, it is preferable that the overall oxygen concentration in the oxidant gas supplied to the burner through oxidant nozzles 22-27 be no less than 29% by volume and, more preferably, no less than 50% oxygen by volume.

Unless the combustible fluid consists of a liquid byproduct having a viscosity of 40 cP or less at ambient temperature, the combustible fluid is preferably processed prior to being atomized in order to facilitate atomization by the atomizing nozzle 21. In the case of a liquid byproduct having a viscosity greater than 40 cP at ambient temperature, a reduction in viscosity may be the only necessary pre-atomization processing step. Any suitable method could be used to reduce the viscosity of the combustible fluid, such as raising the temperature of the combustible fluid, adding a solvent (including water), adding a diluent, or by adding a bio-fuel or petroleum based fuel to the combustible fluid. If the combustible fluid is heated prior to atomization, it is preferable that the atomizing gas is also provided at no less than the same temperature, in order to prevent the atomizing gas from cooling the combustible fluid when the atomizing gas and combustible fluid are combined.

In the case of a solid byproduct, the solid byproduct is preferably combined with a carrier gas or liquid (e.g., natural gas, propane, steam, nitrogen, carbon dioxide, ambient air, oil, alcohol, petroleum based fuel or water). When working with solid byproducts, it is important the particles that make up the solid byproduct be small enough to be atomized when combined with a liquid carrier or readily dispersed when combined with a gaseous carrier. If the average particle size of the solid byproduct is too large, the average particle size is preferably reduced (e.g., by grinding or crushing) prior to atomization or dispersion of the combustible fluid.

In order to ensure that stable combustion is achieved in the combustion zone 14, it is preferable that atomized combustible fluid not be introduced into the combustion zone 14 unless the temperature of the combustion zone 14 is no less than a predetermined minimum temperature. For many byproduct-based combustible fluids, the predetermined minimum temperature is at least 1500 degrees F. For crude glycerol (generated from biodiesel production), a predetermined minimum temperature of at least 1900 degrees F. is preferred.

Figure 5:
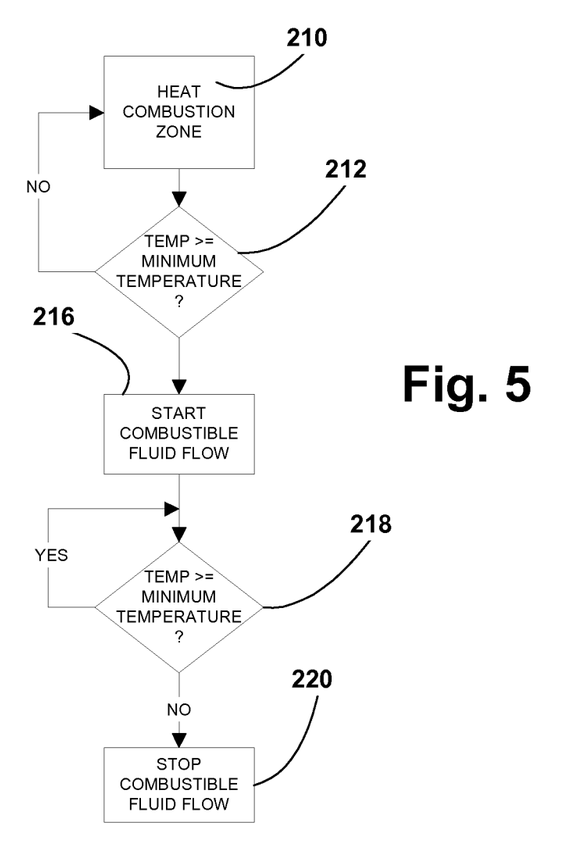
FIG. 5 is a flow chart showing one aspect of the method of the present invention.

As shown in FIG. 5, in this embodiment the combustion zone 14 is preferably pre-heated (step 210) by burning a conventional fuel (such a natural gas, fuel oil or propane) prior to starting the flow of combustible fluid to the atomizing nozzle 21. Once the minimum temperature has been reached (step 212), as measured by the temperature sensor 46, the control unit 16 opens valve 51, which starts the flow of combustible fluid (step 216) to the atomizing nozzle 21. If the temperature in the combustion zone 14 drops below the predetermined minimum temperature while the combustible fluid is being atomized of if the UV sensor 70 detects that the flame has gone out, the control unit is preferably programmed to stop the flow of combustible fluid (step 220) to the atomizing nozzle 21 by closing valve 51.

In an embodiment of the burner system 10 in which a single burner 12 performs the pre-heat step 210, oxidant gas will preferably flow through at least some of the oxidant gas nozzles 22-27 during the pre-heat step 210 in order to support complete combustion of the conventional fuel. When the combustible fluid starts to flow (step 216), the flow of oxidant gas to the oxidant gas nozzles 22-27 will be adjusted as necessary to provide to supply at least 90% of the stoichiometric amount of oxygen required for complete combustion of the combustible fluid and the conventional fuel. Once the combustible fluid flame is established, the flow of conventional fuel can be terminated and the flow of oxidant gas can be reduced (to terminate the portion of the flow of oxidant gas necessary to support combustion of the conventional fuel).

As an alternative to burning a conventional fuel through same burner as is used for the combustible fluid to preheat the combustion zone, one or more burners for use with combustible fluid could be used in a combustion zone in which other burners, burning conventional fuels, are located. In such an embodiment, firing of the combustible fluid burners could be delayed until the combustion zone is heated to the predetermined minimum temperature by the conventional fuel burners. In this embodiment, an ignition source may be needed to ignite the combustible fluid delayed flame.

Referring again to FIG. 3, it has been determined that stable combustion of some byproducts can be sustained if oxidant gas is supplied to the combustion zone through only the primary oxidant nozzle 22 and the oxidant staging nozzles 24-26. Improved performance can be achieved through use of the tertiary oxidant nozzles 27 in combination with the primary oxidant nozzle 22 and the oxidant staging nozzles 24-26.

Figure 4:
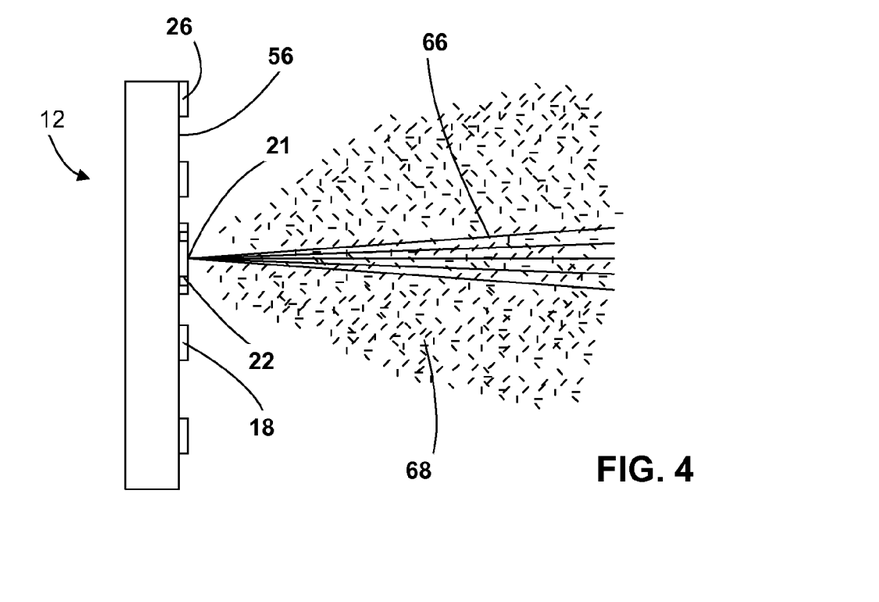
FIG. 4 is a schematic side view showing a typical spray pattern for an air-assisted atomizer spraying crude glycerol.

Use of a set of oxidant nozzles at a location that is at a greater radial distance from the atomizing nozzle 21 than the oxidant staging nozzles 23-26 is especially desirable when burning combustible fluids having relatively high viscosity. In order to fully atomize a combustible fluid at a relatively high viscosity (e.g., greater than 15 cP), the atomizing gas is preferably supplied to the atomizing nozzle 21 at a relatively high pressure and/or flow rate. As shown in FIG. 4, this often results in an atomization spray pattern consisting of a centrally-located spray 66, and a highly-dispersed mist 68. Supplying additional oxidant gas through the tertiary oxidant nozzles 27 provides for more stable, complete, and clean combustion of highly-dispersed atomized combustion fluids.

It is also desirable for the oxidant gas to be provided at a flow rate that provides at least 90% of the stoichiometric amount of oxygen required for complete combustion (convert all of the fuel molecules to carbon dioxide) of the combustible fluid (for example, 3.5 molecules of oxygen are required to completely combust/oxidize one molecule of glycerol). In addition, when the combustion fluid is a bio-fuel byproduct, the oxygen concentration for the oxidant gas (as it is supplied to the oxidant nozzles 22-27) is preferably no less than 29% and, more preferably, no less than 50% by volume.

It should be understood that some available oxygen may be supplied to the combustion zone 14 by the atomizing gas, as well as outside air leakage into the combustion zone 14. In most applications, however, the amount of available oxygen supplied by these sources will be inconsequential, and therefore, will not have a significant effect on the preferred oxygen concentration in the oxidant gas.

In many applications, oxygen concentrations lower than the preferred ranges outlined above will produce undesirable combustion characteristics, including incomplete combustion, unstable combustion and unacceptably large "visible flame detachment." For example, when oxygen concentrations in the oxidant gas fall below 29%, it has been observed that carbon monoxide is produced from combustion of a combustion fluid consisting of 95% glycerol and 5% water. Incomplete combustion of glycerol is also known to produce a highly-toxic compound called acrolein.

"Visible flame detachment" means that there is a gap between the discharge end (or "face") of a burner and the closest portion of the visible flame produced by combustion of the combustible fluid. Large visible flame detachment, i.e., a flame that ignites a long distance from the face of the burner, can be a practical problem for applications in which the combustion zone 14 is relatively small. The capital expenses associated with increasing the size of a combustion zone to accommodate a large visible flame detachment would often be prohibitively high. In addition, an increase in visible flame detachment is often a strong indication of decreased flame stability and decreased combustion efficiency. Furthermore, especially in the case of high viscosity fluids, combustion conditions that produce large visible flame detachment also promote the deposition of unburned combustible fluid onto the walls of the furnace and/or contamination of the molten product that is being heated. Combustible fluid contact with the walls of the furnace can cause refractory damage and other maintenance issues.

Figure 6:
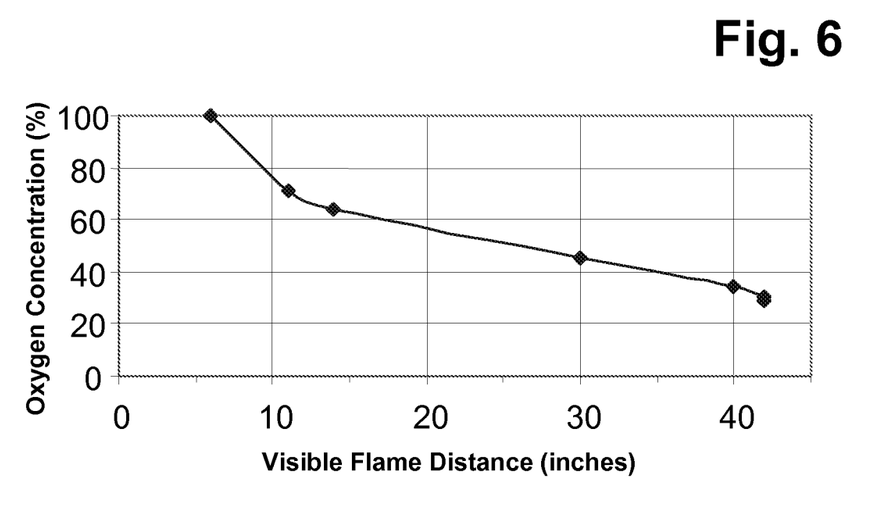
FIG. 6 is a graph showing the distance between the burner face and the visible flame of a combustible fluid consisting of 95% glycerol and 5% water as a function of oxygen concentration in the oxidizing gas delivered by the burner.

For example, FIG. 6 is graph showing the distance between the burner face and the visible flame of a combustible fluid consisting of 95% glycerol and 5% water as a function of oxygen concentration in the oxidizing gas delivered by the burner. Other than changes in oxygen concentration to the oxidant nozzles, all other test conditions were held constant. At 100% oxygen, 28% of the gas flow was directed to the primary oxidant gas nozzle 22 and 72% to the oxidant staging nozzles 24. In each succeeding test (the oxygen concentration being reduced in test), oxygen flow was reduced to the oxidant staging nozzles 24 and air flow was increased to the tertiary oxidant nozzles 27. As shown in FIG. 6, the distance between the burner face and the visible combustion zone increases as overall oxygen concentration delivered by the burner decreases. In addition, the distance between the burner face and the visible combustion zone increases dramatically when the oxygen concentration drops below 60%.

The precise level of oxygen enrichment (i.e., oxygen concentration) required to facilitate clean, stable combustion will, of course, vary depending upon the combustible fluid, e.g. phase, water content, impurities, compositional variability of the byproduct, etc. In addition, due to the potentially high level of compositional variability in bio-fuel byproducts, it is advisable to choose worst case operating parameters, e.g., the predetermined minimum combustion zone temperature, maximum oxygen concentration and minimum flow rates for the combustible fluid and oxidant gas, etc., to accommodate expected variations in combustible fluid composition.

Test data shown in Table A (below) illustrates the benefit of providing significant oxidant gas flow through the tertiary oxidant nozzles 27 in addition to the primary oxidant nozzle 22 and the oxidant staging nozzles 24. The data shown in Table A was gathered from tests run on a combustible fluid consisting of a mixture of 95% glycerol and 5% water. The flow rate of the combustible fluid corresponded to a 3 million Btu/hour combustion rate. Stoichiometric amounts of oxygen for combustible fluid combustion were provided in the oxidizing gas. The overall oxygen concentration in the oxidizing gas was 53.7% for all three tests. The table below shows that the liquid fuel combustion is improved (as evidenced by reduced visible flame detachment) when a lower proportion of oxygen is supplied to the primary oxidant nozzle 24, and further improved when both a lower proportion of oxygen is supplied to the primary oxidant nozzle and a higher proportion of oxygen is supplied to the tertiary oxidant nozzles 27. The "oxygen fraction" values shown in Table A represent the portion of the total oxygen supplied by the burner that is being supplied to each set of nozzles 22, 24, 27.

TABLE A

| Oxygen Concentration (%) | $O_2$ fraction in Primary Oxidant Gas | $O_2$ fraction in Staging Oxidant Gas | $O_2$ fraction in Tertiary Oxidant Gas | Distance from burner of visible ignition (inches) |
| --- | --- | --- | --- | --- |
| 53.7 | 0.27 | 0.29 | 0.44 | 14 |
| 53.7 | 0.28 | 0.37 | 0.35 | 16 |
| 53.7 | 0.54 | 0.28 | 0.18 | 20 |

Table B (below) shows data for similar test conditions as those shown in Table A, but with a combustible fluid consisting of a mixture of 90% glycerol and 10% water, a flow rate corresponding to a 3.5 million Btu/hour combustion rate, and an overall oxygen concentration in the oxidizing gas introduced of 62.2%.

TABLE B

| Oxygen Concentration (%) | $O_2$ fraction in Primary Oxidant Gas | $O_2$ fraction in Staging Oxidant Gas | $O_2$ fraction in Tertiary Oxidant Gas | Distance from burner of visible ignition (inches) |
| --- | --- | --- | --- | --- |
| 62.2 | 0.25 | 0.43 | 0.32 | 16 |
| 62.2 | 0.25 | 0.59 | 0.16 | 22 |

Data shown in Table C (below) illustrates that acceptable combustion characteristics can be achieved with relatively high oxygen concentrations, even if little or none of the oxidant gas flows through the tertiary oxidant nozzles 27. As with Table A, the data shown in Table C was gathered from tests run on a combustible fluid consisting of a mixture of 95% glycerol and 5% water. The flow rate of the combustible fluid corresponded to a 3 million Btu/hour combustion rate. Stoichiometric amounts of oxygen for combustible fluid combustion were provided in the oxidizing gas.

TABLE C

| Oxygen Concentration (%) | $O_2$ fraction in Primary Oxidant Gas | $O_2$ fraction in Staging Oxidant Gas | $O_2$ fraction in Tertiary Oxidant Gas | Distance from burner of visible ignition (inches) |
|---|---|---|---|---|
| 100 | 0.28 | 0.72 | 0 | 7 |
| 53.7 | 0.27 | 0.29 | 0.44 | 16 |
| 34.4 | 0.26 | 0.23 | 0.51 | 32 |

Table D (below) shows data for similar test conditions as the data shown in Table C, but with a combustible fluid consisting of a mixture of 90% glycerol and 10% water and a flow rate corresponding to a 3.5 million Btu/hour combustion rate. Stoichiometric amounts of oxygen are provided in the oxidizing gas for liquid fuel combustion.

TABLE D

| Oxygen Concentration (%) | $O_2$ fraction in Primary Oxidant Gas | $O_2$ fraction in Staging Oxidant Gas | $O_2$ fraction in Tertiary Oxidant Gas | Distance from burner of visible ignition (inches) |
|---|---|---|---|---|
| 100 | 0.26 | 0.74 | 0 | 4 |
| 62.2 | 0.25 | 0.43 | 0.32 | 16 |
| 35.9 | 0.25 | 0.12 | 0.63 | 36 |

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims.

What is claimed is:

1. A method of combusting a combustible fluid in a stable flame, comprising:
    preheating a combustion zone to a temperature of at least 1500 degrees F.;
    reducing the viscosity of a combustible fluid having a flash point of no less than 250 degrees F. to a reduced viscosity of no more than 40 cP, when the combustible fluid has an initial viscosity of greater than 40 cP;
    atomizing the combustible fluid into the combustion zone after preheating the combustion zone;
    concurrently with atomizing the combustible fluid, introducing an oxidant gas into the combustion zone surrounding the atomized combustible fluid, the oxidant gas having an oxygen concentration of no less than 50% on a volume basis and being sufficient to supply at least 90% of a stoichiometric amount of oxygen necessary for combustion of the combustible fluid; and
    combusting the atomized combustible fluid with the oxidant in a stable flame within the combustion zone;
    wherein the method is implemented using an apparatus comprising:
    a burner having at least one atomizing nozzle configured to atomize the combustion fluid into the combustion zone and at least one oxidant gas nozzle surrounding the atomizing nozzle and configured to discharge oxidant gas surrounding the atomized combustion fluid into the combustion zone; and
    a control unit that controls operation of the burner, the control unit including a temperature sensor that is adapted to measure temperature inside the combustion zone and a combustible fluid valve that is adapted to regulate flow of a combustible fluid to the atomizing nozzle and an oxidant gas valve that is adapted to regulate flow of an oxidant gas to the at least one oxidant gas nozzle;
    wherein the control unit is operationally configured to (1) prevent the flow of combustible fluid to the atomizing nozzle unless the temperature sensor indicates a temperature in the combustion zone that is no less than a preset minimum temperature and (2) supply the oxidant gas to the at least one oxidant gas nozzle concurrently with combustible fluid flowing to the atomizing nozzle so that the overall oxygen concentration of the oxidant gas is at least 50%.

2. The method of claim 1, wherein the preset minimum temperature is at least 1500 degrees F.

3. The method of claim 1, wherein the preset minimum temperature is at least 1900 degrees F.

4. The method of claim 1, wherein:
    the control unit further comprises an oxidant gas flow controller that regulates flow of an oxidant gas to the at least one oxidant gas nozzle and the control unit is operationally configured to provide a flow rate of oxidant gas through the at least one oxidant gas nozzle that is sufficient to provide at least a 90% of a stoichiometric amount of oxygen for combustion of the combustible fluid, based on the flow of the combustible fluid to the atomizing nozzle.

5. The method of claim 1, wherein the burner is adapted to atomize a combustible fluid having a viscosity of no more than 40 cP at the atomizing nozzle.

6. The method of claim 5, wherein the atomizing nozzle comprises a gas-assisted atomizing nozzle.

7. The method of claim 1, the burner further comprising at least one oxidant gas staging nozzle that is spaced from the atomizing nozzle.

8. The method of claim 7, the burner further comprising at least one tertiary oxidant gas staging nozzle positioned a greater radial distance from the atomizing nozzle than the at least one oxidant gas staging nozzle.

9. The method of claim 1, wherein the control unit is operationally configured to preheat the combustion zone to the preset minimum temperature using a fuel other than the combustible fluid.

10. A method of combusting a combustible fluid in a stable flame, comprising:
- preheating a combustion zone to a temperature of at least 1500 degrees F. prior to commencing flow of a combustible fluid having a flash point of no less than 250 degrees F.;
- reducing the viscosity of the combustible fluid to a reduced viscosity of no more than 40 cP when the combustible fluid has an initial viscosity of greater than 40 cP;
- atomizing the combustible fluid into the combustion zone after preheating the combustion zone and after reducing the viscosity of the combustible fluid;
- concurrently with atomizing the combustible fluid, introducing an oxidant gas into the combustion zone surrounding the atomized combustible fluid, the oxidant gas having an oxygen concentration of no less than 50% on a volume basis and being sufficient to supply at least 90% of a stoichiometric amount of oxygen necessary for combustion of the combustible fluid; and
- combusting the atomized combustible fluid with the oxidant in a stable flame within the combustion zone.

11. The method of claim 10, wherein the step of reducing viscosity of the combustible fluid comprises adding a solvent to the combustible fluid.

12. The method of claim 10, wherein the combustible fluid has a heat of vaporization of no less than 2500 BTU/gal.

13. The method of claim 10, wherein the combustible fluid has a heating value of no more than 100,000 BTU/gal.

14. The method of claim 10, further comprising:
- terminating atomization of the combustible fluid if the temperature of the combustion zone drops below a predetermined minimum temperature.

15. The method of claim 10, further comprising:
- maintaining a temperature of no less than 1500 degrees F. in the combustion chamber until atomization of the combustible fluid is terminated.

16. The method of claim 10, wherein preheating the combustion zone comprises preheating the combustion zone to a temperature of at least 1900 degrees F.

17. The method of claim 12 wherein the combustible fluid has a heating value of no more than 100,000 BTU/gal.

18. The method of claim 10, wherein the combustible fluid has a heating value of no more than 100,000 BTU/gal and a heat of vaporization of no less than 2500 BTU/gal.

* * * * *